Patented Mar. 15, 1932

1,850,058

UNITED STATES PATENT OFFICE

JOHN C. BAKER, OF MONTCLAIR, AND FRANZ C. SCHMELKES, OF BLOOMFIELD, NEW JERSEY, ASSIGNORS TO WALLACE & TIERNAN PRODUCTS, INC., OF BELLEVILLE, NEW JERSEY, A CORPORATION OF NEW JERSEY

METHOD OF MAKING MONO-CHLORAMINE

Application filed May 20, 1931. Serial No. 538,868.

No Drawing.

This invention relates to methods of making mono-chloramine or mixtures of mono- and di-chloramine containing large proportions of the former, especially dilute solutions thereof suitable for use in the sterilization of water.

When solutions containing available chlorine react with solutions containing ammonia or ammonium salts, the resulting product may be nitrogen tri-chloride ($NCl_3$), di-chloramine ($NHCl_2$), or mono-chloramine ($NH_2Cl$). As to which of these three compounds are formed by the reaction of the two solutions, can be determined and controlled by the regulation of the hydrogen ion concentration of the resulting mixture. In case the solution is more acid than pH 4.4, nitrogen tri-chloride is formed almost quantitatively, and if more alkaline than pH 8.5, mono-chloramine is formed substantially exclusively. At hydrogen ion concentrations within the range of 4.4 to 8.5, varying proportions of di-chloramine and mono-chloramine are formed. At pH 7.0 (neutral point) the proportion is about 55% of the mono-compound to 45% of the di-chloramine.

Mono-chloramine is much slower in its sterilizing action than di-chloramine, but for numerous uses, such, for example, as swimming pools, speed of action of the reagent when added to the water is not so essential as simplicity of preparation of the solution of the reagent to be added to the water. In the latter respect mono-chloramine is superior as the pH does not have to be controlled within such narrow limits.

Control of the pH involves not merely adjusting the initial pH, but also providing means for maintaining such pH throughout the reaction. This is necessary since, except when ammonia and hypochlorous acid are used, the formation of either $NHCl_2$ or $NH_2Cl$ results in the liberation of acid. This will be clear from the following illustrative reactions:

(1) $NH_3 + HOCl = NH_2Cl + H_2O$
(2) $NH_3 + Cl_2 = NH_2Cl + HCl$
(3) $NH_4Cl + HOCl = NH_2Cl + H_2O + HCl$
(4) $NH_4Cl + Cl_2 = NH_2Cl + 2HCl$

Therefore, unless the pH is controlled when ammonium salts are used, the pH rapidly decreases so that, while mono-chloramine may be formed at first, the solution rapidly becomes so acid that nitrogen tri-chloride is formed exclusively during the latter part of the reaction. While this change in pH may be avoided by the use of ammonia and hypochlorous acid, such solution of the problem is not desirable since ammonia is much less convenient and far more dangerous to handle than ammonium salts.

One of the objects, therefore, of the present invention is to provide a simple, cheap method of absorbing the acid formed when ammonium salts are employed in the manufacture of mono-chloramine.

We have found that the acid formed can be very easily and cheaply absorbed and the pH kept within the range over which the mono-chloramine is the preponderating product by the use of bases, especially substantially insoluble bases, such as calcium carbonate. The reaction involved, when using the latter substance, is approximately the following:

(5) $2CaCO_3 + 2HCl = CaCl_2 + Ca(HCO_3)_2$

While the reaction (4) produces twice as much acid as reaction (3), the advantage of hypochlorous acid over chlorine in this respect is more apparent than real, since calcium carbonate is required to form hypochlorous acid from chlorine.

(6) $2CaCO_3 + 2Cl_2 + 2H_2O = CaCl_2 + 2HOCl + Ca(HCO_3)_2$

The same total amount of calcium carbonate is required whether the entire reaction takes place by reactions (6), (3) and (5), or by reactions (4) and (5).

The simplest method of carrying out the process is to mix ammonium chloride or other ammonium salt with calcium carbonate and then add the mixture as a unit to the treating tank.

A desirable mixture to use has the following composition: 19% $NH_4Cl$; 81% $CaCO_3$. With this proportion, assuming all ingredients to be chemically pure, the ammonium chloride is slightly in excess of that required for reaction (2). The calcium carbonate is about 12 to 15% over that required to absorb all the hydrochloric acid per reaction (5).

In general, the ammonium salt and the calcium carbonate are mixed in about the ratio of one unit of $NH_4$ to each two units of $CaCO_3$, the latter preferably being in slight excess of that called for by such ratio.

This mixture is used in the proportion of 4 pounds to each 1 pound of chlorine used in reaction (4). As solutions of chlorine gas have a pH within the range in which nitrogen tri-chloride is formed, we prefer to add chlorine gas or a solution of chlorine gas to a solution of ammonium salt instead of adding the latter dry or in solution to a solution of chlorine, although both procedures may be used with good results. As mono-chloramine is more stable in dilute than in concentrated solutions, the reacting solution should ordinarily not contain much over 0.2% chlorine and preferably about 0.1%. A suitable procedure is to agitate 0.4 pounds of the mixture of ammonium chloride and calcium carbonate with each 100 pounds of water used, to dissolve the ammonium chloride, and then add to each 100 pounds of such solution 0.1 pound of chlorine gas. Suitable stirring or agitating means may be provided to disseminate the insoluble carbonate powder in the solution while the chlorine is being added thereto. Suitable means may be employed for settling any excess carbonate out of the solution before the latter is discharged to the point of use.

While ammonium chloride and calcium carbonate have been mentioned as convenient substances to employ, the invention is not limited thereto. Other salts of ammonium may be employed, such as the sulphate. Similarly, other substantially insoluble bases may be used, such as magnesium carbonate. The latter compound, or mixtures of calcium and magnesium carbonate such as dolomite, are much slower to react with acid than calcium carbonate and, hence, are less desirable.

What is claimed is:

1. The process of making mono-chloramine, which comprises causing available chlorine to react on ammoniacal material in the presence of a weak base adapted and in quantity sufficient to absorb all the acid liberated by said reaction.

2. The process as in claim 1, in which the base consists principally of a substantially insoluble basic material.

3. The process as in claim 1, in which the base is principally calcium carbonate.

4. The process of making mono-chloramine, which comprises adding a mixture of an ammonium salt and a substantially insoluble base to a solution containing available chlorine, the amount of base added being in excess of that required to absorb all the acid liberated by the reaction between the ammonium salt and the available chlorine.

5. The process as in claim 4, in which the base is principally calcium carbonate.

6. The process of making mono-chloramine, which comprises adding a mixture of about 19% ammonium chloride and 81% calcium carbonate to a solution of chlorine.

7. The process of making mono-chloramine as in claim 6, in which the mixture is added to chlorine in the ratio of about 4 pounds of the mixture to each 1 pound of chlorine.

8. The process of making mono-chloramine, which comprises causing chlorine to react on an ammonium salt in about stoichiometrical proportions, in the presence of calcium carbonate in excess of the amount required to absorb the acid liberated by such reaction with the formation of calcium bi-carbonate.

9. The process of making mono-chloramine, which comprises adding a mixture of ammonium salt and calcium carbonate to a solution of chlorine, the proportion of ammonium salt to calcium carbonate being slightly less than the ratio of one unit of $NH_4$ to each two units of $CaCO_3$, and the proportion of ammonium salt to chlorine being about in the ratio of one unit of $NH_4$ to each unit of $Cl_2$.

10. The process of making mono-chloramine, which comprises mixing an ammonium salt and a base with water and then adding chlorine thereto, the amount of base added being sufficient to absorb all the acid liberated by the reaction between the ammonium salt and the chlorine.

In testimony whereof, we have hereunto set our hands.

JOHN C. BAKER.
FRANZ C. SCHMELKES.